United States Patent

[11] 3,616,161

[72] Inventors Herbert Bartl
Cologne, Stammheim;
Frank Wingler, Leverkusen, both of
Germany
[21] Appl. No. 726,600
[22] Filed May 3, 1968
[45] Patented Oct. 26, 1971
[73] Assignee Farbenfabriken Bayer Aktiengesellschaft
Leverkusen, Germany
[32] Priority June 30, 1967
[33] Germany
[31] F 52828

[54] TEXTILE AND PAPER LIKE MATERIAL
4 Claims, No Drawings
[52] U.S. Cl. .................................................. 161/151,
156/306, 161/162, 161/168, 264/126
[51] Int. Cl. .................................................. B32b 5/16
[50] Field of Search ........................................... 161/151,
162, 168, DIG. 5; 264/126; 260/2.5; 156/306

[56] References Cited
UNITED STATES PATENTS
| | | | |
|---|---|---|---|
| 2,875,186 | 2/1959 | Gerhard et al. ............... | 260/92.8 |
| 2,761,177 | 9/1956 | Walters ......................... | 161/168 X |
| 3,348,991 | 10/1967 | Abell et al. ................... | 264/126 X |
| 3,461,016 | 8/1969 | Irving et al. .................. | 264/126 X |

*Primary Examiner*—Robert F. Burnett
*Assistant Examiner*—Roger L. May
*Attorney*—Connolly and Hutz

ABSTRACT: A sheet-form product having a thickness from $10\mu$ to 1 mm. comprising a matted together fused plurality of hollow beads, said hollow beads prior to matting and fusing having a diameter of from $10\mu$ to 3 mm. and comprising a copolymer of (a) 70 to 92 parts by weight of vinyl chloride and (b) 30 to 8 parts by weight of ethylene or 30 to 8 parts by weight of a mixture of ethylene and propylene containing 0.1 to 15 parts by weight of propylene. These products are useful as substitutes for paper, fleeces and nonwoven fabrics.

TEXTILE AND PAPER LIKE MATERIAL

This invention relates to textile and paperlike materials comprising thermoplastic plastics, ethylene/vinyl chloride copolymers in particular, and to a process for their production.

Accordingly, the invention relates to a process for the production of textile and paperlike material, in which hollow beads of a thermoplastic plastic, having a diameter of from 10 $\mu$ to 3 mm. and a softening point of from 30° to 150° C., optionally in admixtures with fibrous materials, are sintered together and welded under pressure and at elevated temperature.

In the context of the present invention, thermoplastic plastics are, for example, such products as homopolymers and copolymers of styrene, olefins, acrylates, methacrylates, and acrylonitrile, polyamides, and polyesters. The structure of the hollow beads of the thermoplastic plastics should be such that a shell of a thermoplastic plastic encloses a hollow space or cavity, which is largely free of solids, and accordingly the beads are similar in shape to miniature of "microballoons." Foam particles of spongelike structure, for example the kind formed during the foaming of polystyrene with volatile solvents, are undesirable. The shell of the microballoon should have the ability to soften at temperatures in the range from 30° to 150° C., and preferably at temperatures from 50° to 120° C., so that the microballoons can be welded together, optionally in the presence of fibrous materials.

Copolymers comprising 70 to 92 parts by weight of vinyl chloride and from 30 to 8 parts by weight of ethylene and optionally 30 to 8 parts by weight of ethylene and propylene, whereby 0,1 to 15 parts by weight of the ethylene replaced by propylene are preferably used as the starting material for the production of textile and paperlike materials according to the invention. Copolymers such as these show particularly favorable properties, so far as application is concerned, a favorable softening range, and are difficulty flammable or totally nonflammable. Another advantage of these copolymers is that they can be readily and safely converted into hollow beads with a diameter of from 10 $\mu$ to 3 mm. Hollow beads of this kind can be produced by the process disclosed in Belgian Pat. No. 702,673. In this process, 70 to 92 parts by weight of vinyl chloride and 30 to 8 parts by weight of ethylene or ethylene and propylene, whereby 0,1 to 15 parts by weight of the ethylene are substituted by propylene are copolymerized up to a maximum conversion rate of 95 percent, and the resulting copolymers are expanded into hollow beads by the residual monomers present in the copolymer, optionally in the presence of another expanding agent.

The sheet-form products according to the invention may be obtained, for example, by collapsing or bursting the hollow beads under pressure. The thin membranes become matted and are welded under the action of heat. Temperatures of from 30° to 150° C., and preferably in the range from 50° to 90° C., at pressures of from 1–20 atmos., have proved to be suitable for this purpose, although it is also possible to operate at higher pressures.

If worked continuously, the process according to the invention is with advantage carried out on heated rollers. The sheet-form products produced, for example from the ethylene/vinyl chloride copolymer which is preferably used are similar in many respects to paper, for example in their handle, their multilayer structure and also in their permeability to air. Moreover, they have other properties which make the material particularly interesting. The papers can be produced in any required thickness ranging from 10 $\mu$ up to 1 mm., and preferably from 100 $\mu$ to 1 mm., and have high tear strength. They are waterproof and have an extraordinarily low water-absorbing capacity. The sheet-form products may be coated, flocked, printed or laminated. The papers produced from the above-mentioned ethylene/vinyl chloride copolymers are resistant to petrol, alcohols and fats. One property that deserves particular emphasis in their nonflammability.

In addition, the hollow beads may be mixed in any proportions preferred in amounts of 1,0 to 99 percent by weight, bases on the mixture with fibrous materials of the kind normally used for the production of fleeces and nonwoven fabrics, before they are welded. It is possible in this way to obtain end products whose properties are similar to those of papers and fleecelike products. When the fibrous materials predominate, the effect ultimately obtained is that the fleece is welded by the thermoplastic hollow beads, without becoming excessively compact in its consistency, by virtue of the very low unit weight of the hollow beads.

In addition, it is possible to coat already prepared fleeces with hollow beads and then to sinter the hollow beads under heat and pressure to form a coherent surface coating. It is also possible in this way to obtain laminates.

In the context of the present invention, fibrous materials include such products as, for example, fibers of cellulose such as cellulose hydrate; cotton; fibers of polyamides such as polycaprolactam, polyamides of adipic acid and hexamethylene diamine, and condensation products of amino-undecanoic acid; fibers of polyacrylonitrile; of polypropylene; of polyvinyl chloride; of polyvinylidene chloride; of polyvinyl alcohol; fibers of polyesters, for example based on aromatic dicarboxylic acids such as terephthalic acid and glycols; and fibers of asbestos. Mixtures of the aforementioned fibers may also be used.

The new sheet-form products, with their wide range of properties, are similar in their range of uses both to paper and to fleeces and nonwoven fabrics. However, particular emphasis is attached to the possibility of producing clothing materials and, from them, "paper clothes" with novel effects by virtue of the high tear strength of the materials according to the invention, their nonflammability and resistance to water being of particular advantage in this respect. It is possible by applying limited pressure, for example less than 5 atmos., to weld some of the hollow beads undamaged into the sheet-form product. It is possible in this way to obtain papers with a rough surface, of the kind required for various types of wallpaper. By virtue of the readily obtainable porosity of the material, both the sheet-form products and their constituents are suitable for the production of leather substitutes.

EXAMPLE 1

A mold plate of a vulcanizing press sprayed with a silicone-based separating oil is provided with a 2-mm. thick layer of hollow beads, 0.5–1.5 mm. in diameter, of an ethylene/vinyl chloride copolymer comprising 15 parts by weight of ethylene and 85 parts by weight of vinyl chloride. The plate is then pressed for 10 minutes at 70° C. under 10 atmos. pressure. A paper with a smooth surface, a unit weight of 43 g./m.$^2$ and a thickness of 100 $\mu$ is obtained.

EXAMPLE 2

The plate is pressed as described in example 1; on this occasion however under a pressure of 1 atmos. The layer thickness amounts to 0.5 mm., the weight per unit area being the same. The paper has a textures surface with some of the hollow beads still intact.

EXAMPLE 3

100 parts by volume of hollow beads are mixed with 5 parts by volume of asbestos wool moistened with water, spread out to form a 2-mm. thick plate and dried at 60° C. After pressing for ten minutes at 80° C./10 atmos. pressure, paper with a layer thickness of 550 $\mu$ and a weight per unit area of 210 g./m.$^2$ is obtained.

EXAMPLE 4

A fleece of copper acetate rayon is applied to a 1-mm. thick layer of hollow beads 0.5–1 mm. in diameter. A second 1-mm. thick layer of hollow beads is then applied, covering the fleece. After pressing for 10 minutes at 80° C./10 atmos., a sheet-form product is obtained which is similar in appearance and feel to fleece. It has a layer thickness of 250 μ and a weight per unit area of 100 g./m.².

We claim:

1. A sheet-form product having a thickness from 10 μ to 1 mm. comprising a matted together fused plurality of hollow beads, said hollow beads prior to matting and fusing having a continuous, hole-free, self-supporting wall, a diameter of from 10 μ to 3 mm. and comprising a copolymer of (a) 70 to 92 parts by weight of vinyl chloride and (b) 30 to 8 parts by weight of ethylene or 30 to 8 parts by weight of a mixture of ethylene and propylene containing 0.1 to 15 parts by weight of propylene.

2. The sheet-form product of claim 1 wherein said beads are matted together and welded at a temperature of from 30° to 150° C. at a pressure of from 1 to 20 atmospheres.

3. The sheet-form product of claim 2 wherein said temperature ranges from 50° to 90° C.

4. The sheet-form product of claim 1 laminated to a nonwoven fibrous material.